United States Patent [19]
Koo et al.

[11] Patent Number: 5,965,666
[45] Date of Patent: Oct. 12, 1999

[54] THERMOPLASTIC RESIN COMPOSITION WITH HIGH IMPACT STRENGTH AT LOW TEMPERATURES

[75] Inventors: Jung-Kee Koo; Hee-Gu Yeo; Jong-Chul Lim, all of Seoul, Rep. of Korea

[73] Assignee: Cheil Industries, Inc., Taegu, Rep. of Korea

[21] Appl. No.: 09/026,744

[22] Filed: Feb. 20, 1998

Related U.S. Application Data

[63] Continuation-in-part of application No. 08/611,363, Mar. 6, 1996, abandoned, which is a continuation-in-part of application No. 08/322,928, Oct. 13, 1994, abandoned.

[30] Foreign Application Priority Data

Oct. 19, 1919 [KR] Rep. of Korea ............... 93-21721

[51] Int. Cl.[6] .................................................. C08G 63/48
[52] U.S. Cl. ........................ 525/66; 525/57; 525/64; 525/70; 525/73; 525/76; 525/78; 525/80; 525/89; 525/95; 525/98; 526/72
[58] Field of Search ............................ 525/57, 64, 66, 525/70, 73, 76, 78, 80, 89, 95, 98; 526/72

[56] References Cited

U.S. PATENT DOCUMENTS

| | | | |
|---|---|---|---|
| 4,321,336 | 3/1982 | Meyer et al. | 525/183 |
| 4,429,076 | 1/1984 | Saito et al. | 525/57 |
| 4,496,690 | 1/1985 | Grant et al. | 525/66 |
| 4,628,072 | 12/1986 | Shiraki et al. | 525/57 |
| 4,981,906 | 1/1991 | Tomono et al. | 525/66 |
| 4,987,185 | 1/1991 | Aoki et al. | 525/66 |

FOREIGN PATENT DOCUMENTS

| 2-240158 | 9/1990 | Japan . |
|---|---|---|
| 2-311545 | 12/1990 | Japan . |

*Primary Examiner*—Samuel A. Acquah
*Attorney, Agent, or Firm*—Woodcock Washburn Kurtz Mackiewicz & Norris LLP

[57] ABSTRACT

This invention relates to a resin composition having high impact strength at low temperatures, comprising a polyamide, a graft copolymer obtained by graft polymerizing a monomer mixture of an aromatic vinyl monomer and a vinyl cyanide monomer to a conjugated diene rubber, a copolymer comprising an aromatic vinyl monomer, a vinyl cyanide monomer and other vinyl monomer copolymerizable with the aromatic vinyl monomer and the vinyl cyanide monomer, a modified hydrogenated block copolymer comprising a conjugated diene rubber and styrene or its derivatives to which has been grafted an unsaturated carboxylic acid or an unsaturated carboxylic anhydride, a copolymer comprising an aromatic vinyl monomer, a maleimide monomer, an unsaturated carboxylic acid or an unsaturated carboxylic anhydride, and other vinyl monomer copolymerizable with the aromatic vinyl monomer, and a graft copolymer obtained by graft polymerizing a maleic anhydride to an ethylene-propylene rubber.

8 Claims, No Drawings

THERMOPLASTIC RESIN COMPOSITION WITH HIGH IMPACT STRENGTH AT LOW TEMPERATURES

This application is a continuation-in-part of application Ser. No. 08/611,363 filed Mar. 6, 1996 and now abandoned, which was a continuation-in-part of application Ser. No. 08/322,928 filed Oct. 13, 1994 and now abandoned.

FIELD OF THE INVENTION

This invention relates to an impact resistant thermoplastic resin composition. More particularly, it relates to a resin composition having high impact strength at low temperatures, comprising a polyamide, a graft copolymer obtained by graft polymerizing a monomer mixture of an aromatic vinyl monomer and a vinyl cyanide monomer to a conjugated diene rubber, a copolymer comprising an aromatic vinyl monomer, a vinyl cyanide monomer and other vinyl monomer copolymerizable with the aromatic vinyl monomer and the vinyl cyanide monomer, a hydrogenated block copolymer comprising a conjugated diene rubber and styrene or its derivatives to which has been grafted an unsaturated carboxylic acid or an unsaturated carboxylic anhydride, a copolymer comprising an aromatic vinyl monomer, a maleimide monomer, an unsaturated carboxylic acid or an unsaturated carboxylic anhydride, and other vinyl monomer copolymerizable with the aromatic vinyl monomer, and a graft copolymer obtained by graft polymerizing a maleic anhydride to an ethylene-propylene rubber.

BACKGROUND OF THE INVENTION

Polyamide resins have excellent abrasion resistance, electrical properties, mechanical strength and chemical resistance. Therefore, their molded products have been used for various mechanical parts as engineering plastics. However, they have drawbacks such as large water absorbance, low impact resistance, particularly low notched impact strength. Further, they also have drawbacks that they are inferior in heat resistance under a high load or in moldability because they are crystalline resins.

Since the polyamide resins have such drawbacks, their use as engineering plastics is limited, and in some cases, their excellent properties can not be adequately utilized.

Among the conventional resin compositions composed of a polyamide resin and a styrene-type polymer, there has been no resin material which has not only excellent properties of both resins but also excellent impact resistance at a low temperature.

In this point of view, U.S. Pat. No. 4,987,185 to Aoki et al discloses a resin composition capable of providing a molded product having excellent heat resistance and impact resistance, particularly, remarkably improved impact resistance at a low temperature, by blending a certain specific copolymer containing an α,β-unsaturated dicarboxylic anhydride monomer component to a resin mixture comprising a polyamide resin and a certain specific rubber-modified styrene graft copolymer.

The U.S. patent discloses an impact resistant thermoplastic resin composition having a notched Izod impact strength of at least 73 kg•cm/cm as measured at 23° C. and a notched Izod impact strength of at least 44 kg•cm/cm as measured at −20° C. As shown in FIG. 1 of the U.S. patent, the notched Izod impact strength is rapidly reduced below −20° C.

U.S. Pat. No. 4,429,076 to Saito et al discloses a thermoplastic polymer composition comprising (a) a component A consisting of modified block copolymers and the ionically crosslinked products of the modified block copolymer with one metal ion, (b) a component B of polyamides, polyurethanes, vinylalcohol polymers, polyacrylates, polymethacrylates, chlorinated hydrocarbon polymers or ionomers, and optionally (c) styrene polymer and olefin polymer to improve processability. Although the polymer composition employs a modified block copolymer, the polymer composition is not for a polymer composition having excellent impact strength at low temperatures.

It is an object of the present invention to provide a resin composition capable of providing a molded article having remarkably improved impact strength at a low temperature to about −30° C., by adding a hydrogenated block copolymer to which has been grafted by an unsaturated carboxylic acid or an unsaturated carboxylic anhydride, and an aromatic vinyl copolymer containing a maleimide together, to the base resin of the present invention.

SUMMARY OF THE INVENTION

The thermoplastic resin composition of this invention comprises: from 30 to 70% by weight of a polyamide (A); from 20 to 60% by weight of a graft copolymer (B) obtained by graft polymerizing from 40 to 90% by weight of a monomer mixture comprising from 30 to 70% by weight of an aromatic vinyl monomer and from 70 to 30% by weight of a vinyl cyanide monomer (provided that the total amount of said monomer mixture is 100% by weight) to from 60 to 10% by weight of a conjugated diene rubber (provided that the total amount of said graft copolymer (B) is 100% by weight); from 0 to 30% by weight of a copolymer (C) comprising from 40 to 90% by weight of an aromatic vinyl monomer, from 10 to 60% by weight of a vinyl cyanide monomer and from 0 to 40% by weight of other vinyl monomer copolymerizable with the aromatic vinyl monomer and the vinyl cyanide monomer (provided that the total amount of said copolymer (C) is 100% by weight); from 1 to 20% by weight of a modified hydrogenated block copolymer (D) comprising a conjugated diene rubber and styrene or its derivatives to which has been grafted an unsaturated carboxylic acid or an unsaturated carboxylic anhydride; from 1 to 20% by weight of a copolymer (E) comprising from 30 to 69% by weight of an aromatic vinyl monomer from 30 to 50% by weight of a maleimide, from 1 to 20% by weight of an unsaturated carboxylic acid or an unsaturated carboxylic anhydride, and from 0 to 50% by weight of other vinyl monomer copolymerizable with the aromatic vinyl monomer (provided that the total amount of said copolymer (E) is 100% by weight); and from 0 to 10% by weight of a graft copolymer (F) obtained by graft polymerizing a maleic anhydride to an ethylene-propylene rubber (provided that said thermoplastic resin composition is 100% by weight).

DETAILED DESCRIPTION OF THE INVENTION

Now, the present invention will be described in detail.

The polyamide (A) constituting the resin composition of the present invention is an injection-moldable conventional nylon-type thermoplastic resin. Specific examples of such polyamide (A) include nylons called by common names such as nylon 6, nylon 66, copolymer nylon (copolymer of caprolactam with hexamethylenediamine adipate), nylon 610, nylon 612, nylon 11, nylon 12 and nylon MXD 6 (condensation polymer of m-xylenediamine with adipic acid) and copolymers comprising these nylons as main components, and mixtures thereof. Among them, nylon 6, nylon 66 or a copolymer nylon, or mixture thereof is particularly preferred.

For satisfactory physical properties and heat and impact resistances of the resin composition according to the present invention, a polyamide having a melting point above 200° C., and a relative viscosity (measured at 25° C. with 1% by weight of polyamide added to m-cresol) of 2.0 or higher may preferably be employed.

The graft copolymer (B) constituting the resin composition of the present invention is composed of from 10 to 60% by weight of a conjugated diene rubber and from 90 to 40% by weight of a monomer mixture comprising from 30 to 70% by weight of an aromatic vinyl monomer component and from 70 to 30% by weight of a vinyl cyanide monomer component.

The conjugated diene rubber as a component constituting the graft copolymer (B) is a rubbery polymer containing at least 50% by weight of a conjugated diene monomer component such as butadiene, isoprene or chloroprene and having a glass transition temperature of not higher than 0° C. Specific examples of such a conjugated diene rubber include known synthetic rubbers such as butadiene rubber (BR), styrene-butadiene rubber (SBR), acrylonitrile-butadiene rubber (NBR) and isoprene rubber (IR).

This conjugated diene rubber is supplied in the form of a rubber latex or a solid rubber and will be used in the state of an emulsion or solution depending upon the process for the preparation of the graft copolymer (B).

Specific examples of the aromatic vinyl monomer component as a component of the above monomer mixture constituting the graft copolymer (B) include styrene, an a-methylstyrene, a ring-substituted alkylstyrene such as p-methylstyrene and vinyl naphthalene. These monomers may be used alone or in combination as a mixture of two or more.

Specific examples of the vinyl cyanide monomer component as a component of the above monomer mixture constituting the graft copolymer (B) include acrylonitrile, methacrylonitrile and α-chloroacrylonitrile.

There monomers may be used alone or in combination as a mixture of two or more.

The graft copolymer (B) used in the present invention can be prepared by graft-copolymerizing the monomer mixture comprising as the main components the aromatic vinyl monomer and the vinyl cyanide monomer in the presence of rubber by a conventional method such as emulsion polymerization, suspension polymerization, bulk polymerization or solution polymerization.

It is particularly preferred to employ emulsion polymerization, since it is thereby easy to control the average particle size of graft rubber in the graft copolymer (B), the graft ratio and the rubber content.

The copolymer (C) constituting the resin composition of the present invention is a thermoplastic resin comprising from 40 to 90% by weight of an aromatic vinyl monomer, from 10 to 60% by weight of a vinyl cyanide monomer and from 0 to 40% by weight of other vinyl monomer copolymerizable with the aromatic vinyl monomer and the vinyl cyanide monomer. The aromatic vinyl monomer and the vinyl cyanide monomer which are components constituting the copolymer (C) are the same as the respective vinyl monomers exemplified as the components of the monomer mixture in the graft copolymer (B).

Examples of the other vinyl monomer copolymerizable with the aromatic vinyl monomer and the vinyl cyanide monomer are methyl-, ethyl-, propyl-, and n-butyl(meth) acrylic acid ester monomers.

The method and conditions for the polymerization of the copolymer (C) may optionally be selected from emulsion polymerization, suspension polymerization, solution polymerization and bulk polymerization in accordance with the conventional production technique of e.g. an acrylonitrile-styrene copolymer (SAN resin) and from a batch system and a continuous system.

Further, the copolymer (C) may be prepared at the same time as the polymerization of the graft copolymer (B) in the same polymerization system, or may be prepared separately by setting up its own polymerization method and conditions.

The modified hydrogenated block copolymer (D) constituting the resin composition of the present invention is obtained by graft polymerizing an unsaturated carboxylic acid or an unsaturated carboxylic anhydride to a hydrogenated block copolymer comprising a conjugated diene rubber and styrene or its derivatives. The hydrogenated block copolymer composes of compound blocks of styrene or its derivatives and polymer blocks of conjugated diene. The polymer blocks of conjugated diene are hydrogenated compounds whose unsaturation degree is lower than 5%. The compound blocks of styrene or its derivatives have a molecular weight of 5,000–100,000 and the polymer blocks of of conjugated diene have a molecular weight of 30,000–300,000, before the block copolymer is hydrogenated. The compound blocks of styrene or its derivatives are employed in the range of 10–40% by weight and the polymer blocks of of conjugated diene are employed in the range of 90–60% by weight. The hydrogenation of the block copolymer is performed by anion polymerization using a metal compound catalyst. Specific examples of the unsaturated carboxylic acid include maleic acid, fumaric acid and acrylic acid, and those of the unsaturated carboxylic anhydride are maleic acid anhydride and methacrylic acid ester.

Specific examples of the conjugated diene rubber are butadiene rubber (BR), styrene-butadiene rubber (SBR), acrylonitrile-butadiene rubber (NBR) and isoprene rubber (IR). As a component of the copolymer (D), the styrene and its derivatives include styrene, an α-alkylstyrene such as α-methylstyrene and a ring-substituted alkylstyrene such as p-methylstyrene.

The copolymer (E) constituting the resin composition of the present invention comprises from 30 to 69% by weight of an aromatic vinyl monomer component, from 1 to 20% by weight of an unsaturated carboxylic acid or an unsaturated carboxylic anhydride, from 30 to 50% by weight of a maleimide monomer component and from 0 to 50% by weight of other vinyl monomer copolymerizable with the aromatic vinyl monomer. The copolymer (E) is a thermoplastic hard resin having excellent heat resistance, since it contains an unsaturated carboxylic acid or an unsaturated carboxylic anhydride monomer component and a maleimide monomer component.

The aromatic vinyl monomer for the copolymer (E) may be the same as the aromatic vinyl monomer described above as the component for the graft copolymer (B). The unsaturated carboxylic acid and the unsaturated carboxylic anhydride for the copolymer (E) may be the same as those described above as the components for the block copolymer (D).

Specific examples of the maleimide for the copolymer (E) include maleimide, N-aromatic maleimides such as N-phenylmaleimide, N-(o-methylphenyl)maleimide, N-(m-methylphenyl)maleimide, N-(p-methylphenyl)maleimide and N-naphthylmaleimide, N-cycloalkylmaleimides such as N-cyclohexylmaleimide and N-aliphatic alkylmaleimides having an alkyl group of from 1 to 10 carbon atoms. These monomers may be used alone or in combination as a mixture of two or more. Among them, a combination of N-phenylmaleimide and maleimide is particularly preferred from the viewpoint of the heat resistance of the copolymer (E).

The other vinyl monomer copolymerizable with the aromatic monomer for the copolymer (E) may be the same as the other vinyl monomer described above as the component for the copolymer (C).

The graft copolymer (F) constituting the resin composition of the present invention is obtained by graft polymerizing a maleic anhydride to an ethylene-propylene rubber.

The resin composition of the present invention is prepared by weighing and mixing from 30 to 70% by weight of a polyamide resin (A), from 20 to 60% by weight of a graft copolymer (B), from 0 to 30% by weight of a copolymer (C), from 1 to 20% by weight of a modified hydrogenated block copolymer (D), from 1 to 20% by weight of a copolymer (E) and from 0 to 20% by weight of a graft copolymer (F), providing that the total amount of the resin composition is 100% by weight.

Conventional mixing and kneading methods may be employed for blending and kneading the components constituting the resin composition of the present invention. For example, a mixture of one or more kinds of these copolymer resins in the form of powder, beads, flakes or pellets may be mixed and kneaded by an extruder such as a single-screw extruder or a twin-screw extruder, or by a kneading machine such as a Banbury mixer, a pressure kneader or a twin roll mill, to obtain a resin composition. In some cases, it is possible to employ a method wherein one or more kinds of these copolymer resins are mixed in a non-dried state after the polymerization, followed by precipitation, washing, drying and kneading.

With respect to the order for this mixing and kneading, the three or four resin or copolymer components may be simultaneously mixed and kneaded, or one or more resin or copolymer components may firstly be mixed and kneaded and a separately kneaded mixture of one or more resin or copolymer components may be added thereto, followed by kneading to obtain a desired resin composition.

The resin composition hereby obtained may be used for molding as it is or after being dried. Various resin additives such as a lubricant, a releasing agent, a coloring agent, an antistatic agent, a flame retardant, a ultraviolet absorber, a light stabilizer, a heat stabilizer, a filler or a nucleating agent may be added in a suitable combination to the resin composition of the present invention in an amount and of the type not adversely affect the nature of the resin. As the filler, a fiber-like reinforcing agent such as glass fiber, metal fiber, carbon fiber or potassium titanate whiskers, talc, clay, potassium carbonate, mica, glass flake, milled fiber, metal flake and metal power, may be mentioned. These fillers may be used alone or in combination as mixture of two or more.

The resin composition of the present invention may be formed into shaped products such as automobile parts, electrical parts, industrial parts or goods for sport by various molding methods such as injection molding, extrusion molding or compression molding, which are useful for applications where excellent heat resistance and impact resistance at low temperatures are required.

The resin composition of the present invention can be used as a thermoplastic resin material having extremely high impact resistance, particularly excellent notched Izod impact strength at a low temperature. Also, the resin composition shows good compatibility and processability and gives a molded product having excellent heat resistance and the mechanical strength.

This invention may be better understood by reference to the following examples which are intended for purposes of illustration and are not to be construed as in any way limiting the scope of the invention which is defined in the claims appended hereto.

EXAMPLES (A) Polyamide Resin

Two different polyamide resins ($A_1$ and $A_2$) were used in the Examples of the present invention. $A_1$ is nylon6 (product #: KN-170) of Kolon Co., Ltd. of the Republic of Korea and $A_2$ is nylon 66 (product #: 40-IB) of Monsanto Co., Ltd. of the U.S.A.

(B) Graft Polymer

Two different graft polymers ($B_1$ and $B_2$) used in the Examples were synthesized as follows:

$B_1$: A mixture of 450 g of polybutadiene latex, 390 g of styrene, and 160 g of acrylonitrile were emulsion-polymerized in a reactor vessel by the addition of 2 g of dodecylmercaptan, 5 g of potassium peroxide, and 5 g of sodium oleate. The graft polymer ($B_1$) was obtained.

$B_2$: A mixture of 150 g of polybutadiene latex, 510 g of alphamethylstyrene, 90 g of styrene, and 250 g of acrylonitrile were emulsion-polymerized in reactor vessel by the addition of 2 g of t-dodecylmercaptan, 5 g of potassium persulfate, and 5 g of sodium oleate. The graft polymer ($B_2$) was obtained from the reaction products.

(C) Copolymer

Two different copolymers ($C_1$ and $C_2$) were prepared as follows:

$C_1$: A mixture of 710 g of styrene and 270 g of acrylonitrile was suspension-polymerized in a reaction vessel by the addition of 5 g t-dodecylmercaptan. The copolymer ($C_1$) was then obtained from the reaction products.

$C_2$: A mixture of 710 g of styrene and 230 g of acrylonitrile was emulsion-polymerized in a reaction vessel by the addition of t-dodecylmercaptan. The copolymer ($C_2$) was then obtained.

(D) Modified Hydrogenated Block Copolymer

A commercial resin (G-1901X: Shell Chemical, Inc.) was used as the component of the hydrogenated block copolymer.

(E) Copolymer

Two different copolymer resins ($E_1$ and $E_2$) were used as the component of (E) in the Examples. $E_1$ is the Polyimilex PSX-371 of Nippon Catalysts, Inc. of Japan, and $E_2$ is the MS-NA of Denka, Inc. of Japan.

(F) Graft Polymer

The graft copolymers ($F_1$ to $F_4$) constituting the resin composition of the present invention are prepared by graft polymerizing a maleic anhydride (MA) to an ethylene-propylene rubber (EPR) adding dicumyl peroxide (DCP). The contents of the ethylene-propylene rubber, maleic anhydride and dicumyl peroxide are shown in Table 1. The ethylene-propylene rubber was a product prepared by Kumho E. P. Rubber Co. of the Republic of Korea as KEP020-P. The graft copolymers ($F_1$ to $F_4$) was prepared using a biaxial extruder with L/D=34 and $\phi$=40 mm. The temperature range of the cylinder was 150–190° C. and the speed of screw was 300 rpm. The grafted content of maleic anhydride and content of gel portion were measured and shown in Table 1.

TABLE 1

| | | Graft Polymer | | | |
|---|---|---|---|---|---|
| | | $F_1$ | $F_2$ | $F_3$ | $F_4$ |
| Proportions (Parts by weight) | EPR | 100 | 100 | 100 | 100 |
| | MA | 10 | 3.0 | 5.0 | 7.0 |
| | DCP | 0.05 | 0.15 | 0.25 | 0.35 |
| Grafted content of MA (%) | | 0.5 | 1.2 | 1.3 | 1.4 |
| Content of gel (%) | | 2.7 | 18.2 | 60.5 | 82.1 |

Examples 1–12

Examples 1–12 are the preparation of the thermoplastic resin compositions of various compositions by blending components (A), (B), (C), (D), (E), and (F) as shown in Table 2. The component resins were uniformly mixed in a Hensel mixer before the mixture was extruded through an extruder with a 40 mm diameter at 230–270° C. in pellet forms. The pellets were dried at 80° C. for 6 hours and extruded into test samples in a 6 oz. extruder at molding temperature of 240–280° C. and barrel temperature of 70° C. Impact strengths of the test samples of Examples 1–12 were tested according to Izod impact strength ASTM D648(⅛" notch). The test results are presented in Table 2.

TABLE 2

| | | | Examples | | | | | |
|---|---|---|---|---|---|---|---|---|
| | | | | 1 | 2 | 3 | 4 | 5 | 6 |
| Proportions (Parts by weight) | Polyamide | $(A_1)$ | 53 | — | 53 | 45 | 60 | 60 |
| | | $(A_2)$ | — | 50 | — | — | — | — |
| | Graft copolymer | $(B_1)$ | 28 | 25 | 28 | — | 20 | — |
| | | $(B_2)$ | — | — | — | 35 | — | 35 |
| | Copolymer | $(C_1)$ | — | — | — | 5 | 5 | — |
| | | $(C_2)$ | — | — | — | — | — | — |
| | Hydrogenated block copolymer | (D) | 14 | 18 | 5 | 5 | 5 | 5 |
| | Copolymer | $(E_1)$ | 5 | — | — | — | 5 | 5 |
| | | $(E_2)$ | — | 7 | 5 | 5 | — | — |
| | Graft copolymer | $(F_1)$ | — | — | 10 | — | 10 | — |
| | | $(F_2)$ | — | — | — | 5 | — | 5 |
| | | $(F_3)$ | — | — | — | — | — | — |
| | | $(F_4)$ | — | — | — | — | — | — |
| Physical properties | Impact strength[1] (notched) (kg·cm/cm) | 25° C. | NB | NB | NB | NB | 75 | NB |
| | | 0° C. | NB | 84 | NB | 84 | 65 | NB |
| | | –30° C. | 70 | 65 | 75 | 53 | 45 | 78 |
| | Tensile strength[2] (kg/cm²) | | 11571 | 10238 | 15270 | 16720 | 17350 | 16285 |
| | Heat distortion temperature[3] (° C.) | | 67 | 65 | 73 | 76 | 74 | 72 |

| | | | Examples | | | | | |
|---|---|---|---|---|---|---|---|---|
| | | | | 7 | 8 | 9 | 10 | 11 | 12 |
| Proportions (Parts by weight) | Polyamide | $(A_1)$ | — | 45 | 45 | — | — | 52 |
| | | $(A_2)$ | 50 | — | — | 40 | 40 | — |
| | Graft copolymer | $(B_1)$ | — | 30 | 30 | — | 40 | 23 |
| | | $(B_2)$ | 35 | — | — | 40 | — | — |
| | Copolymer | $(C_1)$ | — | — | — | — | — | — |
| | | $(C_2)$ | 5 | — | — | — | — | — |
| | Hydrogenated block copolymer | (D) | 5 | 10 | 10 | 10 | 10 | 6 |
| | Copolymer | $(E_1)$ | 10 | 15 | — | 5 | 5 | 9 |
| | | $(E_2)$ | — | — | 15 | — | — | — |
| | Graft copolymer | $(F_1)$ | — | — | — | — | — | 10 |
| | | $(F_2)$ | — | — | — | 5 | 5 | — |
| | | $(F_3)$ | 5 | — | — | — | — | — |
| | | $(F_4)$ | — | — | — | — | — | — |
| Physical properties | Impact strength[1] (notched) (kg·cm/cm) | 25° C. | NB | NB | NB | NB | NB | 80 |
| | | 0° C. | 75 | NB | NB | 68 | 65 | 73 |
| | | –30° C. | 52 | 65 | 72 | 51 | 50 | 66 |
| | Tensile strength[2] (kg/cm²) | | 16527 | 12472 | 12575 | 11725 | 11543 | 10593 |
| | Heat distortion temperature[3] (° C.) | | 73 | 73 | 73 | 72 | 72 | 67 |

TABLE 2-continued

Notes:
NB: No Break
1): Measured in accordance with ASTM A256.
2): Measured in accordance with ASTM D638.
3): Measured in accordance with ASTM D648.

COMPARATIVE EXAMPLES 1–12

Comparative Examples 1–12 relate to preparation of the thermoplastic resin compositions comprising four or less out of five component resins (A), (B), (C), (D), (E) and (F). In Table 3, composition data for resin compositions in Comparative Examples 1–12 are presented. The preparing method of test samples from Comparative Examples 1–12 was the same as that of Examples 1–12. Impact strengths of test samples from resin compounds prepared in Comparative Examples 1–12 were measured according to Izod Impact Strength ASTM D648 (⅛" notch). The impact strength data are presented in Table 3. Comparative Examples 3, 5 and 10 which were carried out in accordance with U.S. Pat. No. 4,429,076 to Saito et al showed poor impact strengths at low temperature as well.

TABLE 3

| | | | Comparative Examples | | | | | |
|---|---|---|---|---|---|---|---|---|
| | | | 1 | 2 | 3 | 4 | 5 | 6 |
| Proportions (Parts by weight) | Polyamide | ($A_1$) | 53 | — | 55 | 50 | 50 | 55 |
| | | ($A_2$) | — | 50 | — | — | — | — |
| | Graft copolymer | ($B_1$) | 42 | 40 | 30 | — | 35 | — |
| | | ($B_2$) | — | — | — | 25 | — | 35 |
| | Copolymer | ($C_1$) | — | — | — | — | 5 | — |
| | | ($C_2$) | — | — | — | — | — | — |
| | Hydrogenated block copolymer | (D) | — | — | 15 | — | 10 | — |
| | Copolymer | ($E_1$) | 5 | — | — | 25 | — | — |
| | | ($E_2$) | — | 10 | — | — | — | — |
| | Graft copolymer | ($F_1$) | — | — | — | — | — | 10 |
| | | ($F_2$) | — | — | — | — | — | — |
| | | ($F_3$) | — | — | — | — | — | — |
| | | ($F_4$) | — | — | — | — | — | — |
| Physical properties | Impact strength[1] (notched) (kg · cm/cm) | 25° C. | 87 | 91 | NB | 15 | 28 | 30 |
| | | 0° C. | 62 | 74 | 50 | 12 | 12 | 10 |
| | | −30° C. | 20 | 25 | 22 | 7 | 7 | 7 |
| | Tensile strength[2] (kg/cm$^2$) | | 13310 | 12170 | 8250 | 15930 | 10540 | 10572 |
| | Heat distortion temperature[3] (° C.) | | 73 | 76 | 66 | 78 | 70 | 69 |

| | | | Comparative Examples | | | | | |
|---|---|---|---|---|---|---|---|---|
| | | | 7 | 8 | 9 | 10 | 11 | 12 |
| Proportions (Parts by weight) | Polyamide | ($A_1$) | — | 55 | — | 50 | 75 | 50 |
| | | ($A_2$) | 55 | — | 55 | — | — | — |
| | Graft copolymer | ($B_1$) | — | — | — | 25 | — | 15 |
| | | ($B_2$) | 35 | 35 | 35 | — | 33 | — |
| | Copolymer | ($C_1$) | — | — | — | 5 | — | 10 |
| | | ($C_2$) | — | — | — | — | — | — |
| | Hydrogenated block copolymer | (D) | — | — | — | 20 | — | 10 |
| | Copolymer | ($E_1$) | — | — | — | — | 5 | — |
| | | ($E_2$) | — | — | — | — | — | 10 |
| | Graft copolymer | ($F_1$) | — | — | — | — | 5 | — |
| | | ($F_2$) | 10 | — | — | — | — | 5 |
| | | ($F_3$) | — | 10 | — | — | — | — |
| | | ($F_4$) | — | — | 10 | — | — | — |
| Physical properties | Impact strength[1] (notched) (kg · cm/cm) | 25° C. | 28 | 15 | 21 | 85 | 77 | 45 |
| | | 0° C. | 11 | 12 | 11 | 17 | 35 | 20 |
| | | −30° C. | 10 | 7 | 8 | 11 | 27 | 12 |
| | Tensile strength[2] (kg/cm$^2$) | | 10320 | 10427 | 10101 | 6950 | 13593 | 11251 |
| | Heat distortion temperature[3] (° C.) | | 69 | 69 | 65 | 67 | 74 | 71 |

Notes:
NB: No Break

TABLE 3-continued

[1]: Measured in accordance with ASTM A256.
[2]: Measured in accordance with ASTM D638.
[3]: Measured in accordance with ASTM D648.

What is claimed is:

1. A thermoplastic resin composition having high impact strength at low temperatures, which comprises:

from 30 to 70% by weight of a polyamide (A);

from 20 to 60% by weight of a graft copolymer (B) obtained by graft polymerizing from 40 to 90% by weight of a monomer mixture comprising from 30 to 70% by weight of an aromatic vinyl monomer and from 70 to 30% by weight of a vinyl cyanide monomer onto from 60 to 10% by weight of a conjugated diene rubber;

from 0 to 30% by weight of a copolymer (C) which is obtained by polymerizing from 40 to 90% by weight of an aromatic vinyl monomer, from 10 to 60% by weight of a vinyl cyanide monomer and from 0 to 40% by weight of a vinyl monomer selected from the group consisting of methyl-, ethyl-, propyl-, and n-butyl (meth)acrylic acid ester monomers;

from 1 to 20% by weight of a modified block copolymer (D) which is obtained by grafting an unsaturated carboxylic acid or an unsaturated carboxylic acid anhydride onto a hydrogenated block copolymer obtained by hydrogenating a conjugated diene-styrene block copolymer;

from 1 to 20% by weight of a copolymer (E) which is obtained by polymerizing from 30 to 69% by weight of an aromatic vinyl monomer, from 30 to 50% by weight of a maleimide, from 1 to 20% by weight of an unsaturated carboxylic acid or an unsaturated carboxylic anhydride, and from 0 to 50% by weight of other vinyl monomer copolymerizable with the aromatic vinyl monomer; and from 0 to 10% by weight of a graft copolymer (F) obtained by graft polymerizing a maleic anhydride onto an ethylene-propylene rubber.

2. The thermoplastic resin composition according to claim 1, wherein said aromatic vinyl monomer is selected from the group consisting of a styrene, an α-methylstyrene, a p-methylstyrene and a vinyl naphthalene.

3. The thermoplastic resin composition according to claim 1, wherein said vinyl cyanide monomer is selected from the group consisting of an acrylonitrile, a methacrylonitrile and an α-chloroacrylonitrile.

4. The thermoplastic resin composition according to claim 1, wherein said conjugated diene rubber is selected from the group consisting of a butadiene rubber (BR), a styrene-butadiene rubber (SBR), an acrylonitrile-butadiene rubber (NBR) and an isoprene rubber (IR).

5. The thermoplastic resin composition according to claim 1, wherein said other vinyl monomer is selected from the group consisting of (1) methyl-, ethyl-, propyl-, and n-butyl (meth)acrylic acid ester monomers.

6. The thermoplastic resin composition according to claim 1, wherein said unsaturated carboxylic acid is selected from the group consisting of a maleic acid, a fumaric acid and an acrylic acid.

7. The thermoplastic resin composition according to claim 1, wherein said unsaturated carboxylic anhydride is a maleic anhydride.

8. The thermoplastic resin composition according to claim 1, wherein said maleimide is selected from the group consisting of N-phenylmaleimide, N-(o-methylphenyl) maleimide, N-(m-methylphenyl)maleimide, N-(p-methylphenyl)maleimide, N-naphthylmaleimide, and N-aliphatic alkylmaleimides having an alkyl group of from 1 to 10 carbon atoms.

* * * * *